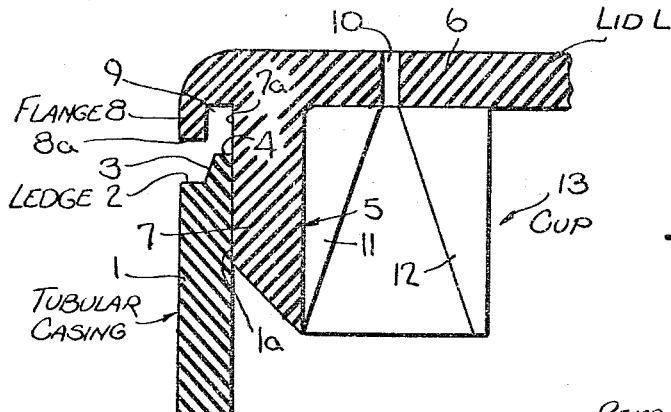
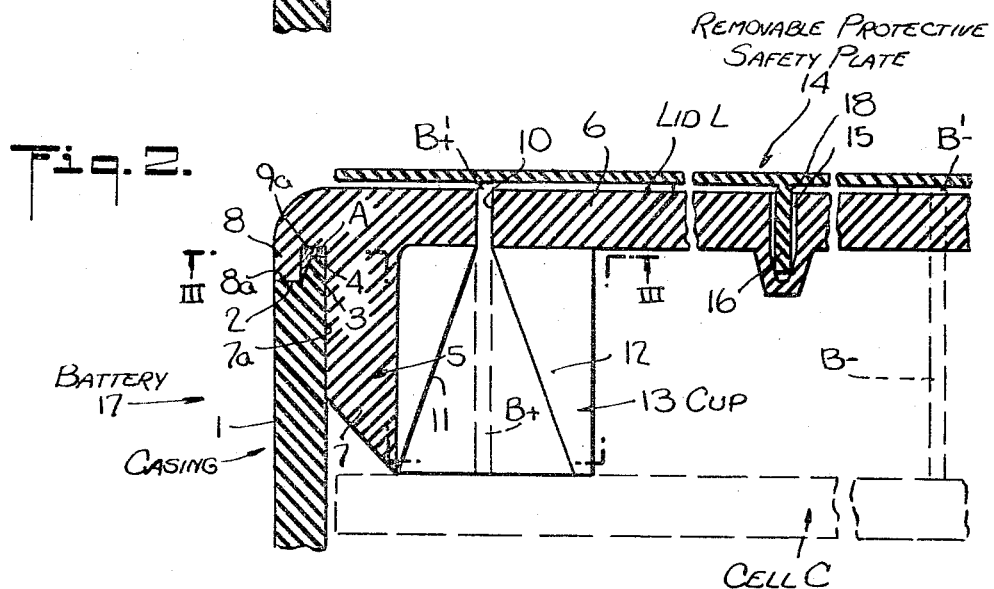
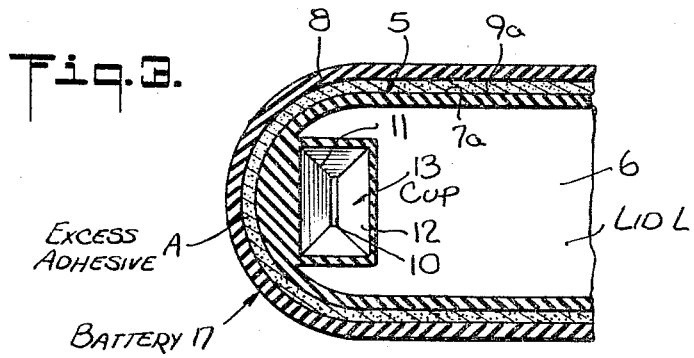

United States Patent Office 3,320,096
Patented May 16, 1967

3,320,096
BATTERY CASE AND COVER AND METHOD OF SEALING THE SAME
Jean Firmin Jammet, Poitiers, Vienne, France, assignor to Societe des Accumulateurs Fixes et de Traction (Société Anonyme), Romainville, France, a company of France
Filed July 21, 1964, Ser. No. 384,190
Claims priority, application France, July 23, 1963, 942,351
4 Claims. (Cl. 136—170)

The invention relates to a sealing device for a plastic casing, advantageously used for making primary batteries.

The use of a plastic casing and lid for making primary batteries is well known. Such a casing comprises a housing in which the cells are placed, separated and insulated by means of a U-folded cardboard coated with e.g. a layer of pitch. The vertical wall of the lid is in line with the vertical wall of the casing and is provided with slots through which the terminal blades may protrude.

The casing and lid are usually stuck or adhered together by a suitable adhesive material.

Such known devices or arrangements have the following drawbacks:

On the one hand, the blades will not tightly fit in the slots. On the other hand, because of their lack in stiffness, the walls of the casing may part from the lid due to faulty adhesion; in fact, it is difficult to obtain a perfect adhesion between the lid and the casing since use of an excess of adhesive material would result in overflow on the outside of the casing.

A principal object and feature of this invention is to remedy these drawbacks.

A further object and feature of this invention is to provide a sealing device or arrangement for a casing, particularly one useful in making primary batteries.

According to a feature of the invention, the joining surfaces of the lid and casing are arranged so that, in the closed state, a gap or space is provided between them, preferably along the closure line to receive the excess of the adhesive material.

According to another feature or characteristic of the invention, the walls of both the casing and the lid are provided with two joining zones situated in different planes, the gap resulting between these planes being different on the lid and on the casing so that, in closed state, two corresponding zones remain spaced so as to provide spare room or space for the excess of the adhesive. Preferably, both the casing and the lid are of plastic material.

In a preferred embodiment, the end wall of the casing edge adjacent the lid has a special profile which comprises a ledge serving as an abutment for a part of the lid and also comprises a flared portion terminating preferably in a flat portion. According to a further feature or characteristic of the invention, the lid comprises a flange portion adapted to abut the said ledge which portion is longer or deeper than the said flared portion of the end wall of said casing edge to provide the said gap to receive said adhesive material.

Other objects and features of the invention will become apparent from the following specification and the accompanying drawings forming a part thereof which show as a non-limiting example, a preferred embodiment of a sealing arrangement or device in accordance with this invention.

In the drawings:

FIGURE 1 is a fragmentary sectional view of the device or arrangement with the casing and lid in partially united positions prior to complete assembly;

FIGURE 2 is a similar fragmentary sectional view of the device or arrangement subsequent to complete assembly of the casing and lid; and FIGURE 3 is a fragmentary sectional view on a reduced scale taken generally along line III—III of FIGURE 2 and viewed in the direction of the arrows.

Referring now to the drawings, an end of the wall 1 of the tubular casing terminates in a special profile comprising a ledge 2 to serve as an abutment and in an adjoining flared portion 3 preferably provided with a flat upper portion 4. The lid L essentially comprises a fairly long, tubular body 5 closed by the cover part 6. The wall 7 of the tubular body 5 has a substantial area and its surface 7a fits snugly within the corresponding inner tubular surface 1a of the wall 1. The lid L is provided with a flange 8 whose width corresponds substantially to that of the ledge 2 and whose lower end 8a may rest on said ledge. Between this flange 8 and the wall surface 7a of body 5 is a space 9 intended on assembly to receive the flared portion 3 of casing 1. This flared portion 3, however, is shallower than the space 9, so that, when the lower end 8a of the flange 8 abuts or rests on ledge 2, a free space or gap 9a is left between the tubular body 5 of the lid L and the wall 1, as is clearly shown in FIG. 2.

This free space or gap 9a is intended on assembly of lid L and casing 1 to receive the excess A of adhesive, the said adhesive during assembly being preferably applied to the wall surface 7a of the tubular body 5.

Thus, the walls of the casing 1 and lid L are rigidly held together by this adhesive. The above-mentioned gap 9a is reserved to receive the excess A of said adhesive. Part of this excess A of adhesive may even flow to the lower end 8a of flange 8 to join it to ledge 2 of casing 1. Thus, the walls of casing 1, including ledge 2 and flared portion 3 are permanently joined to the lid body 5 and cover 6 and cannot part from lid L.

The cover part 6 has blade slots 10 (only one of which is shown) through which contact terminal blades B+ and B— of cells C within casing 1 respectively extend above the upper surface of cover part 6. It is necessary that these blades B+ and B— be tightly sealed in respective of said blade slots 10.

According to the invention, this tight sealing is effected as follows:

As shown in the various figures, the blade slots 10 are inwardly protected by the walls 11 and 12 of a downturned cup 13 of insulative material. These cups 13 are intended to be filled by the sealing material usually poured onto the cells C, for example, pitch or a polymerizable plastic material, such as polyesters. This filling can be effected by a direct pouring or by turning the battery casing 1 upside down, so that the pitch can flow into the cups 13.

This filling of cups 13 with said pitch or plastic material not only ensures a tight sealing fit for the terminal blades B+ and B— in slots 10, but also complements the lid-casing joint. Moreover, the blades B+ and B— are protected against a possible contact with the electrolyte of cells C.

Advantageously, the lid L can also be used to carry a removable safety plate 14 of insulative material to protect the folded down protrusions B'+ and B'— of said blades B+ and B—, that project above the upper surface of the cover part 6 of the lid L. As shown in FIGURE 2, cover part 6 of lid L is for this purpose provided with at least one and preferably two recesses 15 which open outwardly, and in which one or two pins 16 of the plate 14 respectively fit.

Each pin 16 frictionally fits into its recess 15 so that it may break off readily when the plate 14 is pulled off to put the battery 17 into use. In order to help breaking each pin 16 off, its base may be provided with a notch 18 or the like so as to decrease its mechanical strength. Each pin 16 may be retained in its recess 15 as by means of a suitable conventional adhesive or solvent. The said safety plate 14 may be given any suitable shape, particularly one which covers both folded down portions B′+ and B′− of the terminal blades B+ and B− in order to prevent possible short-circuiting of the battery 17 before it is put into use.

Of course, the sealing arrangement described may be used for any other device requiring tight sealing, for example, electrical condensers or electrolytic cells.

Although a specific embodiment of the invention has been described and shown, variations within the scope of the claims are possible and are contemplated. There is no intention of limitation to the exact disclosure herein made.

What is claimed is:

1. A sealing arrangement for an electric battery or the like comprising:
    a tubular casing open at one end,
    a lid comprising a cover and a tubular body depending therefrom for closing said battery, said tubular body fitting snugly against said tubular casing and joined thereto in a fluid-tight sealing engagement by adhesive, said cover having a recess in its exterior surface and a pair of slots extending therethrough,
    a pair of electrode terminal blades of opposite polarity extending through said slots and having end portions folded down against the exterior of said cover,
    means forming a fluid tight seal between said blades and said lid,
    and a removable safety plate for preventing short circuiting of said battery prior to use thereof, said safety plate comprising a single strip of non-conductive material in contact with said end portions of said blades and spaced from said cover and a frangible member extending from said strip into said recess, said frangible member being destructible to permit removal of said safety plate prior to using said battery.

2. A sealing arrangement according to claim 1 in which said tubular body is of substantial length providing a sealing surface of an appreciable area between said tubular body and said tubular casing, said tubular casing terminating at its open end in a ledge adjacent the exterior wall of the casing and a lip projecting beyond said ledge, said lip comprising a flat portion and a conical portion connecting said flat portion with said ledge, said lid having a flange longer than said lip and corresponding in width to said ledge, said flange being in contact with said ledge whereby a gap for excess of adhesive material is provided between said lip and said ledge.

3. A sealing arrangement according to claim 1 in which said means forming a fluid tight seal between said blades and said lid comprises cups adjacent to said casing on the interior thereof, and sealing material in said cups and in said slots for providing a fluid tight seal between said blades and said lid.

4. A method of providing a sealing arrangement for an electric battery comprising providing a thin tubular casing and a separate lid therefor which are intended to be joined, said lid and said casing each having thin walls provided with joinable surfaces, said lid having an external flange portion and a longer internal wall spaced from said flange and defining therewith an internal substantially rectangular gap adjacent said flange portion and said casing having a peripheral ledge on which the bottom of said flange is adapted on juncture to rest, and an internally disposed inwardly flared portion adjacent said ledge and adapted to extend upwardly into the substantially rectangular gap but admeasured on said juncture of said lid and casing to leave a free space between the upper end of the flared portion and the uppermost wall defining said gap, applying adhesive material onto the external portion of said longer internal wall, then joining said lid and casing by moving them together, said space in said gap serving to accumulate excess adhesive upon juncture of said lid and casing and thus preventing extrusion thereof externally of both said casing and said flange portion, thereby providing an assembled lid and casing with a substantially unbroken side wall and without any extruded adhesive.

References Cited by the Examiner

UNITED STATES PATENTS

| 1,176,468 | 3/1916 | Koretzky | 136—181.1 X |
| 1,299,149 | 4/1919 | Duvall | 136—135 |
| 1,367,593 | 2/1921 | Ford | 136—181 X |
| 2,070,426 | 2/1937 | Faber | 136—181.1 X |
| 2,221,542 | 11/1940 | Hopkins. | |
| 2,942,055 | 6/1960 | Doyle et al. | 136—170 X |

FOREIGN PATENTS 969,344   5/1958   Germany.

WINSTON A. DOUGLAS, *Primary Examiner.*

D. L. WALTON, *Assistant Examiner.*